United States Patent [19]
Sydansk

[11] Patent Number: 5,842,519
[45] Date of Patent: Dec. 1, 1998

[54] PROCESS FOR REDUCING HYDROCARBON LEAKAGE FROM A SUBTERRANEAN STORAGE CAVERN

[75] Inventor: Robert D. Sydansk, Littleton, Colo.

[73] Assignee: Marathon Oil Company, Findlay, Ohio

[21] Appl. No.: 859,869

[22] Filed: May 21, 1997

[51] Int. Cl.⁶ .................................................. E21B 33/138
[52] U.S. Cl. ........................ 166/295; 166/300; 405/264
[58] Field of Search .................................. 166/294, 295, 166/300, 270; 405/264

[56] References Cited

U.S. PATENT DOCUMENTS

| | | | |
|---|---|---|---|
| 2,928,247 | 3/1960 | Hubbell | 60/0.5 |
| 2,991,624 | 7/1961 | Closs et al. | 61/0.5 |
| 3,063,246 | 11/1962 | Dougherty | 61/0.5 |
| 3,089,309 | 5/1963 | Closs et al. | 61/0.5 |
| 3,418,812 | 12/1968 | Khan et al. | 61/0.5 |
| 3,771,559 | 11/1973 | Buce | 166/295 |
| 4,010,231 | 3/1977 | Phillips et al. | 264/35 |
| 4,222,975 | 9/1980 | Kirschke | 264/35 |
| 4,683,949 | 8/1987 | Sydansk et al. | 166/270 |
| 4,692,061 | 9/1987 | Lindörfer et al. | 405/128 |
| 4,706,754 | 11/1987 | Smith | 166/295 |
| 4,723,605 | 2/1988 | Sydansk | 166/295 |
| 4,770,245 | 9/1988 | Sydansk | 166/295 |
| 4,790,688 | 12/1988 | Castor | 405/128 |
| 4,844,287 | 7/1989 | Long | 220/429 |
| 5,131,469 | 7/1992 | Lockhart et al. | 166/295 |
| 5,143,958 | 9/1992 | Lockhart et al. | 524/219 |
| 5,219,475 | 6/1993 | Lockhart et al. | 252/8.551 |
| 5,219,476 | 6/1993 | Lockhart et al. | 252/8.551 |
| 5,372,462 | 12/1994 | Sydansk | 166/294 X |
| 5,415,229 | 5/1995 | Sydansk | 166/295 |
| 5,431,226 | 7/1995 | Sydansk | 166/295 |
| 5,462,390 | 10/1995 | Sydansk | 405/264 |

Primary Examiner—Frank S. Tsay
Attorney, Agent, or Firm—J. L. Hummel; J. E. Ebel

[57] ABSTRACT

A process is provided for reducing fluid leakage from or into a subterranean storage cavern through the earthen wall of the storage cavern by sealing a relatively high permeability region of the earthen wall, through which the leakage occurs, with a sealing composition in the form of a gel. The process is initiated by preparing a gelation solution from a crosslinkable polymer, a crosslinking agent, and an aqueous solvent. The gelation solution is dispensed into the storage cavern and substantially gelled at the relatively high permeability region, forming a gel that reduces the permeability of the relatively high permeability region and effectively seals the region to fluid flow therethrough. Alternatively, the gelation solution is placed at the relatively high permeability region of the subterranean storage cavern by injecting the gelation solution into an injection well in fluid communication with the relatively high permeability region. The gelation solution is substantially gelled at the relatively high permeability region, forming the permeability-reducing gel. Either of the above-recited alternatives can also be practiced by substantially gelling the gelation solution prior to placement at the relatively high permeability region and placing the resulting flowing gel at the relatively high permeability region.

45 Claims, 4 Drawing Sheets

# PROCESS FOR REDUCING HYDROCARBON LEAKAGE FROM A SUBTERRANEAN STORAGE CAVERN

TECHNICAL FIELD

The invention relates to a process for storing hydrocarbons in a subterranean storage cavern and more particularly to a process for reducing hydrocarbon leakage from the subterranean storage cavern.

BACKGROUND OF THE INVENTION

Subterranean storage caverns are often used to store and inventory large volumes of fluids of commerce. Hydrocarbon fluids, including crude oil, natural gas, and refined products, are representative fluids of commerce stored in underground storage caverns. Salt dome storage caverns are an exemplary type of cavern for storing hydrocarbon fluids because of the availability of salt dome storage caverns in many suitable storage locales, and the relative impermeability and inertness of the common salt forming the walls of the cavern to the hydrocarbons stored therein. Salt dome storage caverns are usually created by solution mining a portion of the salt deposit from a subterranean salt dome to form a large void in the salt dome walled by the remainder of the salt deposit.

Subterranean storage caverns have proven to be a relatively economical and effective means of fluid storage. Nevertheless, there exists a finite, and often realized, possibility that the storage cavern will contain inherent structural flaws or develop structural flaws during the useful life of the storage cavern, which enable stored fluids to leak from the storage cavern. For example, a stress crack or a leached channel can develop in the wall of a salt dome storage cavern, which provides fluid communication between the storage cavern and an adjacent region of relatively high permeability. Alternatively, solution mining of the salt dome storage cavern can undesirably remove an entire segment of the salt wall, placing a subterranean region of relatively high permeability in direct fluid communication with the storage cavern. Reported significant leakage of oil from the U.S. Strategic Petroleum Reserve caverns evidences the existence of a leakage problem from subterranean storage caverns.

Leaking and loss of stored fluids from a subterranean storage cavern can have several negative impacts. First, a substantial economic loss can result from the loss of a valuable commercial fluid from the storage cavern. Second, substantial environmental damage and liabilities can result if the stored fluid migrates from the storage cavern into a drinking water aquifer or an analogous environmentally damaging phenomenon occurs, particularly if the stored fluid has toxic properties. Third, a serious safety hazard can result, if the stored fluid exhibits hazardous characteristics and escapes into a populated area, as exemplified by the migration of highly flammable natural gas or crude oil from a storage cavern to the ground surface or into occupied structures, such as a building basement.

The present invention recognizes a need for reducing fluid leakage from a subterranean storage cavern. Accordingly, it is an object of the present invention to provide a process for effectively reducing fluid leakage from a subterranean storage cavern. More particularly, it is an object of the present invention to provide a process for effectively sealing fluid leaks in a subterranean storage cavern. It is another object of the present invention to provide such a process that is relatively inexpensive to practice. It is yet another object of the present invention to provide such a process utilizing a reliable sealing composition. It is still another object of the present invention to provide such a process utilizing a sealing composition that is relatively easy to apply to the leak. These objects and others are achieved in accordance with the invention described hereafter.

SUMMARY OF THE INVENTION

The present invention is a process for reducing fluid leakage from a subterranean storage cavern through the earthen wall of the storage cavern into the surrounding environment. The process is effectuated by sealing a relatively high permeability region of the earthen wall through which the leakage occurs with a sealing composition in the form of a gel. The relatively high permeability region contains an anomaly or is a porous medium which the gel plugs.

The process is initiated by preparing a gelation solution, which is the gel precursor. The gelation solution is formed by combining a crosslinkable polymer, a crosslinking agent, and an aqueous solvent in solution. Additional modifying agents can optionally be included in the gelation solution. For example, a density control agent can be included in the gelation solution to adjust the density of the gelation solution so that it has a neutral density relative to the resident liquid of the storage cavern.

The gelation solution is applied to the relatively high permeability region and substantially gelled at the relatively high permeability region, forming a gel that reduces the permeability of the region and effectively seals the region to substantial fluid flow therethrough. Application of the gelation solution to the relatively high permeability region is effected by dispensing the gelation solution from a suitable means positioned in the storage cavern. The dispensing means discharges the gelation solution directly to the relatively high permeability region or, alternatively, discharges the gelation solution into the resident liquid, which migrates to the relatively high permeability region and conveys the entrained gelation solution with it to the region.

In an alternative, application of the gelation solution to the relatively high permeability region is effected by injecting the gelation solution into an injection well in fluid communication with the relatively high permeability region. The gelation solution is injected directly into the relatively high permeability region or injected into an intervening geological medium and conveyed through the geological medium to the relatively high permeability region. The gelation solution is substantially gelled at the relatively high permeability region, forming a gel that reduces the permeability of the region.

Another embodiment of the present invention is practiced in substantially the same manner as each of the above-recited alternatives. However, the gelation solution is substantially gelled, forming a flowing gel, which is applied to the relatively high permeability region in accordance with one of the above-recited alternatives to reduce the permeability of the region.

DESCRIPTION OF PREFERRED EMBODIMENTS

Figure 1:
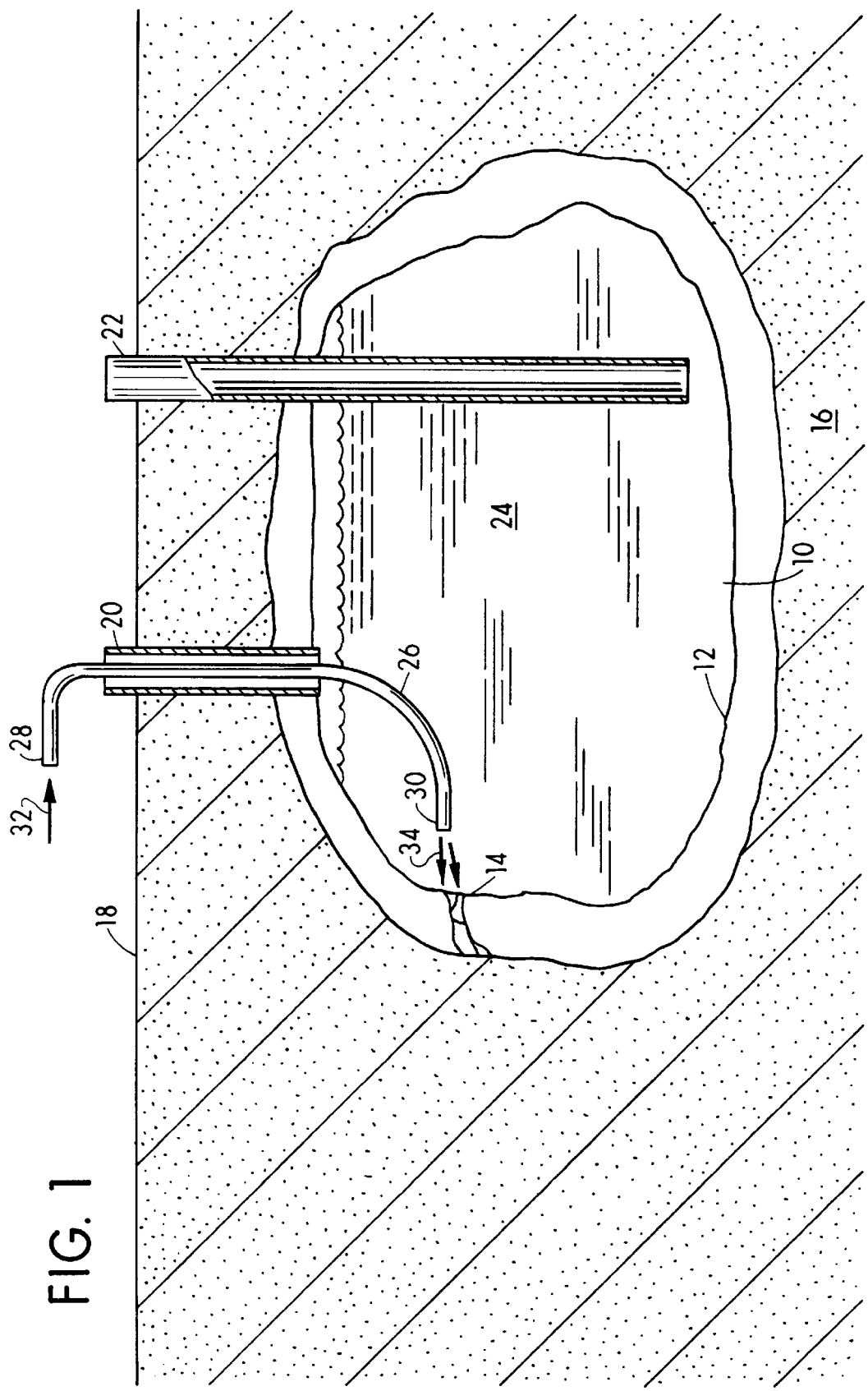
FIG. 1 is a conceptualized view of a salt dome storage cavern in which the process of the present invention is practiced, wherein the cavern wall includes a relatively high permeability treatment region having an anomaly formed therein.

The present invention is a process for treating a subterranean fluid storage cavern having an earthen wall containing a region of relatively high permeability. The entire earthen wall, or a major portion thereof, is formed from a geological material that, in the absence of anomalies, is relatively impermeable to the stored fluid. For example, the earthen wall can be formed from relatively impermeable common salt, granite, or other such impermeable geological material. The earthen wall, however, exhibits leakage of the stored fluid through the relatively high permeability region. The present process is designed to reduce the leakage of the stored fluid through the relatively high permeability region, termed hereafter the treatment region, by placing a sealing composition in the form of a gel at the treatment region to reduce the permeability of the treatment region to the stored fluid. It is understood that the term "reduce the permeability of the treatment region" encompasses totally eliminating the permeability of the treatment region to the stored fluid.

Leakage of the stored fluid through the treatment region is generally attributable to the occurrence of one or more anomalies in the geological material of the treatment region and/or because the treatment region is formed from a highly porous medium. The anomalies or highly porous medium is sufficiently permeable to enable leakage of the stored fluid through the anomalies or highly porous medium into the subterranean environment external to the storage cavern. An "anomaly" is a structural flaw, defined herein as an open volume within the treatment region of the earthen wall, which has very high permeability relative to the remainder of the earthen wall. The term "anomaly" is inclusive of such highly permeable volumes as fractures, fracture networks, joints, cracks, fissures, voids, channels, solution channels, and the like. A "highly porous medium" is defined herein as a material having a very high permeability relative to the remainder of the earthen wall. For example, the highly porous medium can be formed from a substantially continuous consolidated geological material, including sandstone or porous carbonate rock, such as limestone or dolomite. Alternatively, the highly porous medium can be formed from a substantially unconsolidated geological material, including sand or soil.

The process of the present invention is initiated by preparing a liquid gelation solution. A "gelation solution" is defined herein as a gel precursor transformable to a gel after being aged to maturity for a predetermined gel time. A "gel" is defined herein as a continuous three-dimensional crosslinked polymeric network integrating a liquid into the interstices of the network. The present gelation solution comprises a crosslinkable polymer, a crosslinking agent, and an aqueous solvent.

Crosslinkable polymers are well known in the art and any such water-soluble polymer capable of being crosslinked by a crosslinking agent has utility in the gelation solution of the present invention. Water-soluble carboxylate-containing polymers are preferred crosslinkable polymers. Water-soluble carboxylate-containing biopolymers include polysaccharides and modified polysaccharides, such as xanthan gum, guar gum, succinoglycan, scleroglycan, polyvinylsaccharides, carboxymethylcellulose, o-carboxychitosans, hydroxyethylcellulose, hydroxypropylcellulose, and modified starches. Water-soluble carboxylate-containing synthetic polymers are more preferred, including acrylamide polymers. Acrylamide polymers are polymers having one or more acrylamide groups and include polyacrylamide (PA), partially hydrolyzed polyacrylamide (PHPA), copolymers of acrylamide and acrylate, and terpolymers and tetrapolymers of acrylamide. PA, as defined herein, has from about 0% to about 3% of its amide groups hydrolyzed. Although 0% hydrolyzed PA initially lacks any carboxylate groups, it generates carboxylate groups under high-temperature conditions, thereby satisfying the definition of carboxylate-containing polymers having utility within the scope of the present invention. PHPA has greater than about 3% of its amide groups hydrolyzed and less than 100% of its amide groups hydrolyzed. The average molecular weight of an acrylamide polymer having utility herein is generally in a range between about 10,000 and about 50,000,000, preferably between about 150,000 and about 30,000,000, and most preferably between about 200,000 and about 20,000,000.

Crosslinking agents are well known in the art and any such water-soluble crosslinking agent capable of crosslinking the selected crosslinkable polymer has utility herein. Water-soluble complexes containing a reactive transition metal cation and an organic carboxylate anion are preferred crosslinking agents. The term "carboxylate anion" as used herein encompasses carboxylate anionic species including mono-carboxylate anions, such as acetate and propionate, poly-carboxylate anions, such as malonate, and substituted derivatives of carboxylate anions, such as glycolate and lactate. The carboxylate anions are generally obtained from the corresponding acids or salts thereof. Most preferred among such crosslinking agents are those including one or more chromium(III) cations complexed with one or more carboxylate anions. An example of a preferred crosslinking agent is one or more chromium(III) cations complexed with one or more acetate anions, as taught in U.S. Pat. No. 4,683,949 which is incorporated herein by reference.

The aqueous solvent of the gelation solution is an aqueous liquid capable of forming a solution with the selected polymer and crosslinking agent. The term "solution" as used herein, in addition to true solutions, is intended to broadly encompass dispersions, emulsions, or any other homogeneous mixture of the polymer and crosslinking agent in the aqueous solvent. The solvent is generally either a fresh water or a brine. A brine, as defined herein, has a relatively high dissolved salt concentration of at least about 1,000 ppm, and preferably between about 1,500 and about 300,000 ppm.

The gelation solution is prepared by admixing the polymer, crosslinking agent, and solvent together to form a homogeneous fluid. Admixing broadly encompasses batch mixing the components of the gelation solution in bulk external to the cavern and subsequently deploying the gelation solution in the cavern as needed. Alternatively, admixing encompasses mixing the components of the gelation solution on the fly and deploying the gelation solution in the cavern substantially simultaneously upon mixing. The manner of mixing the gelation solution components is not specific to the practice of the present invention. The polymer and crosslinking agent can initially be in a solid or liquid state. If the crosslinking agent is added to the gelation solution as a chromium(III)/carboxylate complex, preferred forms of the chromium(III)/acetate complex crosslinking agent are solid $CrAc_3$, solid $CrAc_3.H_2O$, solid $Cr_3Ac_7(OH)_2$ or a solution labeled "Chromic Acetate 50% Solution" that is commercially available, for example, from McGean-Rohco Chemical Co., Inc., 50 Public Square, No. 1250, Cleveland, Ohio 44113-2251, U.S.A.

The polymer concentration of the resulting gelation solution is generally at least about 500 ppm, preferably at least about 2,000 ppm, and most preferably within a range between about 3,000 ppm and about 100,000 ppm. The crosslinking agent concentration of the gelation solution is generally between about 44 ppm and about 88,000 ppm, and preferably between about 88 ppm and about 18,000 ppm. As such, the corresponding chromium(III) cation concentration of the gelation solution is generally between about 10 ppm and about 20,000 ppm, and preferably between about 20 ppm and about 4,000 ppm.

The gelation solution can optionally contain one or more modifying agents that modify the properties of the gelation solution, the gelation reaction, or the resulting gel. Modifying agents include density control agents, lost circulation agents or gelation rate controlling agents. A density control agent is any material mixed into the gelation solution that substantially modifies the density of the gelation solution, preferably without substantially modifying the subsequent gelation reaction or the strength and integrity of the resulting gel. Density control agents having utility herein that tend to reduce the density of the gelation solution include inert relatively low density fluids such as liquids, for example fresh water, and inert relatively low density solids such as fibers, for example cellulose fibers. Density control agents having utility herein that tend to increase the density of the gelation solution include inert relatively high density liquids, such as a saturated aqueous solution of a relatively high density weighting salt, and inert relatively high density solids, such as sand.

A lost circulation agent is any solid material mixed into the gelation solution that substantially impedes the flow of the gelation solution through highly porous material of a treatment region, preferably without substantially modifying the subsequent gelation reaction or the strength and integrity of the resulting gel. Lost circulation agents are well known in the art of hydrocarbon production and drilling operations and such lost circulation agents have general utility herein. Exemplary lost circulation agents include cellulose fibers, walnut hulls, chopped up tires, sized salt crystals, calcium carbonate, plastic particles, sand, silica flour, barite, metal filings and the like. It is noted that many of the lost circulation agents recited above, can perform a dual function as both a density control agent and a lost circulation agent.

A gelation rate controlling agent is any material mixed into the gelation solution that substantially retards or accelerates the rate of the subsequent gelation reaction, preferably without substantially modifying the strength and integrity of the resulting gel. In some cases within the practice of the present invention, it may be desirable to retard the rate of gelation, such as in high-temperature environments above about 70° C. where the crosslinking agent has an excessively rapid rate of reaction. Gelation rate retarding agents having utility herein include carboxylic acids taught by U.S. Pat. Nos. 4,706,754; 5,131,469; 5,143,958; 5,219,475; and 5,219,476, incorporated herein by reference. Such carboxylic acids include acetic acid, propionic acid, lactic acid, malonic acid and glycolic acid. Other gelation rate retarding agents having utility herein include the carboxylate salts of the above-recited carboxylic acids, including ammonium, potassium or sodium salts of acetate, propionate, lactate, malonate or glycolate. Alternatively, retarded gelation may be achieved without including a gelation rate retarding agent in the gelation solution by appropriate selection of a decarboxylated crosslinking agent in the manner of U.S. Pat. No. 5,431,226, incorporated herein by reference.

In other cases within the practice of the present invention, it may be desirable to accelerate the rate of gelation so that the gelation solution is sufficiently gelled to resist diffusion mixing in the resident liquid of the storage cavern when the gelation solution is applied to the treatment region as described hereafter. Accelerated gelation may be achieved by including a gelation rate accelerating agent in the gelation solution. Gelation rate accelerating agents having utility herein include simple mineral acids and inorganic chromic salts taught by U.S. Pat. Nos. 4,723,605 and 4,770,245, respectively, incorporated herein by reference. Such simple mineral acids include hydrochloric acid, nitric acid, sulfuric acid, and the like. Such inorganic chromic salts include chromic trichloride, chromic triiodide, chromic tribromide, chromic triperchlorate, chromic trinitrate, and the like. Alternatively, accelerated gelation may be achieved without including a gelation rate accelerating agent in the gelation solution by appropriate selection of a crosslinking agent having a more rapid rate of reaction and/or by increasing the concentration of the selected crosslinking agent in the gelation solution.

Upon preparation of the gelation solution, the practitioner applies the gelation solution to the treatment region in accordance with one of a plurality of alternate embodiments described hereafter. The gelation solution is then substantially crosslinked at the treatment region to form a gel. A first embodiment of the invention is described with reference to FIG. 1, wherein a salt dome storage cavern 10 is shown, which is conventionally used to store a liquid hydrocarbon, such as crude oil. The cavern 10 has a wall 12 formed substantially from common salt that is relatively impermeable to the liquid hydrocarbon stored in the cavern 10. The wall 12, however, includes a treatment region 14 having an anomaly formed therein, wherein the anomaly is a fracture network providing a highly permeable, but relatively narrow, flow path for leakage from the cavern 10. The cavern wall 12 is surrounded by a geological medium 16, such as sandstone, limestone, dolomite or the like, that is continuous and consolidated, yet porous. As such the surrounding medium 16 has a high permeability relative to the cavern wall 12. An outlet conduit 20 and an inlet conduit 22 are provided in the cavern 10 to provide direct fluid communication between the cavern 10 and the earthen surface 18 external to the cavern 10.

The cavern 10 is shown to contain a resident liquid 24. For purposes of illustration, the resident liquid 24 is a saturated brine functioning as a displacement liquid. The brine 24 is conventionally introduced into the cavern 10 via the inlet conduit 22 to displace the stored liquid hydrocarbon from the cavern 10 via the outlet conduit 20 when it is desired to process or otherwise use the stored liquid hydrocarbon. It is apparent to the skilled artisan that the resident liquid can alternatively be the stored liquid, or the displacement liquid and stored liquid in combination within the scope of the present invention.

The gelation solution is applied to the treatment region 14 by providing a dispensing tube 26, such as a flexible hose or a pipe, having an inlet end 28 and an outlet end 30. The dispensing tube 26 extends from the surface 18 through the outlet or inlet conduit 20, 22 into the resident liquid 24 contained within the cavern 10, such that the outlet end 30 is positioned in the resident liquid 24 at a distance from the treatment region 14. The prepared gelation solution designated by arrow 32 is fed into the inlet end 28 and displaced through the tube 26. Alternatively, the gelation solution components are fed into the inlet end 28 and displaced through the tube 26 while mixing them in-line to form the gelation solution in situ. In any case, the gelation solution designated by arrows 34 is discharged through the outlet end 30 into the resident liquid 24. A nozzle or a flow distributor (not shown) can be provided at the outlet end 30 to direct the discharged gelation solution toward the treatment region 14 and/or to focus the discharged gelation solution into a narrow band or disperse the discharged gelation solution into a broad spray.

Once the gelation solution is discharged from the outlet end 30, the gelation solution is conveyed in the resident liquid 24 to the treatment region 14. The primary conveyance force on the gelation solution is generally the entrainment force resulting from the flow of resident liquid in the cavern 10 to the treatment region 14 as the resident liquid ahead of it leaks from the treatment region 14 into the surrounding medium 16. The resident liquid entrains the gelation solution and its flow draws the gelation solution to the treatment region 14. Another conveyance force is the discharge force applied to the gelation solution by the tube 26, but this force alone is often not sufficient to convey the gelation solution to the treatment region 14 unless the outlet end 30 is positioned less than about 2 meters from the treatment region 14.

A sufficient amount of a density control agent may be included in the gelation solution with the crosslinkable polymer, crosslinking agent and aqueous solvent to equilibrate the density of the gelation solution to the density of the resident liquid. If the gelation solution has a neutral density relative to the resident liquid, buoyancy forces will not substantially interfere with the above-described conveyance forces placing the gelation solution at the treatment region 14. When the resident liquid is a saturated brine, the resident liquid typically has a density between about 1.7 g/cm$^3$ and about 3.0 g/cm$^3$, and preferably between about 1.8 g/cm$^3$ and about 2.3 g/cm$^3$. Accordingly, a density control agent is selected that enables adjustment of the gelation solution density within the density range of the resident liquid.

The gelation solution preferably plates or penetrates the treatment region 14 on contact and remains at the treatment region 14 as substantial crosslinking proceeds, thereby forming a stable gel. A "stable gel" is characterized herein as a gel that does not exhibit substantial loss of structure over time as evidenced by reduction in gel strength or expulsion of water, termed network breakdown and/or syneresis. Crosslinking between appropriate sites of the same or different polymer molecules creates the network structure of the stable gel. The terms "crosslinking", "gelling" and "gelation" are used synonymously herein. Partial crosslinking of the polymer by the crosslinking agent may occur in the gelation solution before the solution reaches the treatment region 14, but substantial crosslinking resulting in gel formation preferably does not occur until at least a substantial portion of the gelation solution is in place at the treatment region 14. Retarding the rate of gelation in a manner described above can enable sufficient time for disposition of the gelation solution at the treatment region 14 before formation of the gel. Alternatively, accelerating the rate of gelation in a manner described above can effectively resist diffusion mixing of the gelation solution in the resident liquid 24 before the gelation solution reaches the treatment region 14.

In general, placement of a gel in an anomaly preferentially dictates selection of a gel having a relatively high degree of structure. The degree of structure of the gel formulated in the manner of the present invention is inter alia a function of the polymer properties, the polymer concentration, and the degree and character of crosslinking in the gelation solution. The degree of structure of a gel containing an acrylamide polymer is usually increased by increasing the polymer concentration of the gelation solution. However, an oftentimes more cost-effective and preferred means for achieving the same effect is to employ a higher molecular weight polymer at a relatively fixed concentration and initial hydrolysis level. Conversely, a reduction in the degree of structure is achieved by using a lower molecular weight polymer. Thus, the skilled practitioner can modify the degree of structure of the present gel in the above-described manner to correspond with the characteristics of the treatment region 14.

Crosslinking is completed when either substantially all of the reactable crosslinking agent or substantially all of the polymer crosslinking sites are consumed as the gelation solution is aged. After substantial crosslinking, the gelation solution is transformed to a gel that is more resistant to flow than the gelation solution and has sufficient strength to resist propagation from the treatment region 14 during subsequent operations within the storage cavern 10.

Upon substantial gelation, a sufficient volume of the newly-formed gel resides in place at the treatment region 14 to reduce the permeability thereof to the liquid hydrocarbon. Consequently, the gel reduces the ability of the stored liquid hydrocarbon to leak from the cavern 10 via the treatment region 14. It is also noted that the gel retains its stability and relatively high structural strength in the presence of the liquid hydrocarbon and brine. Furthermore, the gel produced hereby typically exhibits a yield pressure greater than pressures that are commonly encountered in the storage cavern 10, thereby enabling the gel to remain in place throughout the operational life of the cavern 10. The "yield pressure" is defined herein as the maximum pressure that can be applied in a given geometry to the gel before the gel experiences structural failure or substantial structural deformation and begins to flow.

Although not shown, it is further within the scope of the present invention to position the outlet end 30 in the resident liquid 24 substantially at the treatment region 14. Accordingly, the gelation solution is discharged into the resident liquid 24 and applied directly to the treatment region 14, thereby avoiding the step of conveying the gelation solution a substantial distance from the outlet end 30 to the treatment region 14 through the resident liquid 24.

An alternate embodiment of the present invention is described with reference to FIG. 2, wherein elements common to FIG. 1 are designated by the same reference characters. A salt dome storage cavern 10' is provided in FIG. 2 that is substantially identical to the salt dome storage cavern 10 of FIG. 1 except that the cavern 10' has a wall 12' that is not formed entirely from common salt. Instead a portion of the wall 12', which constitutes the treatment region 14', is continuous with the porous geological medium 16 surrounding the wall 12'. The porous medium of the treatment region 14' provides a larger areal, but less permeable, flow path relative to the above-described treatment region 14 for the resident liquid 24 to leak from the cavern 10' into the surrounding geological medium 16.

The gelation solution is prepared and applied to the treatment region 14' by the dispensing tube 26 extending from the surface 18 into the resident liquid 24 in substantially the same manner as described above. However, it is preferable in the present embodiment to discharge the gelation solution designated by arrows 34' from the tube 26 in a broad spray because the relatively expansive treatment region 14' is most effectively treated by a broad spray of the gelation solution. The areal expansiveness of the treatment region 14' may also necessitate multiple positioning of the outlet end 30 in the resident liquid 24 proximal to the treatment region 14' to effect uniform coverage of the entire treatment region 14' with the gelation solution. Repositioning of the outlet end 30 is enabled by means such as a remotely operated vehicle (ROV) 36, i.e., a miniature submarine, removably attached to the outlet end 30. An alternate position of the outlet end 30 is shown by dashed lines. It is apparent that other alternate positions of the outlet end 30 not shown are within the scope of the present invention.

The gelation solution of the present embodiment is preferably adjusted to a neutral density to facilitate placement of the gelation solution at the treatment region 14'. Effective permeability reduction can be achieved in the porous medium of the treatment region 14' by plating the surface of the treatment region 14' with the fully matured gel, thereby substantially reducing the cost of materials for the process. A lost circulation agent may be advantageously included in the gelation solution to enhance the plating ability thereof. Placement of a gel at the highly porous medium may be enhanced by selecting a gel having a relatively low degree of structure to achieve at least a slight degree of penetration into the surface of the porous medium for more effective permeability reduction. A gel having a low degree of structure is effectuated as described above by using a lower molecular weight polymer or a lower polymer concentration.

Although not shown, it is further within the scope of the present invention to position the outlet end 30 in the resident liquid 24 substantially at the treatment region 14'. Accordingly, the gelation solution is discharged into the resident liquid 24 and applied directly to the treatment region 14', thereby avoiding the step of conveying the gelation solution a substantial distance from the outlet end 30 to the treatment region 14' through the resident liquid 24.

Figure 3:
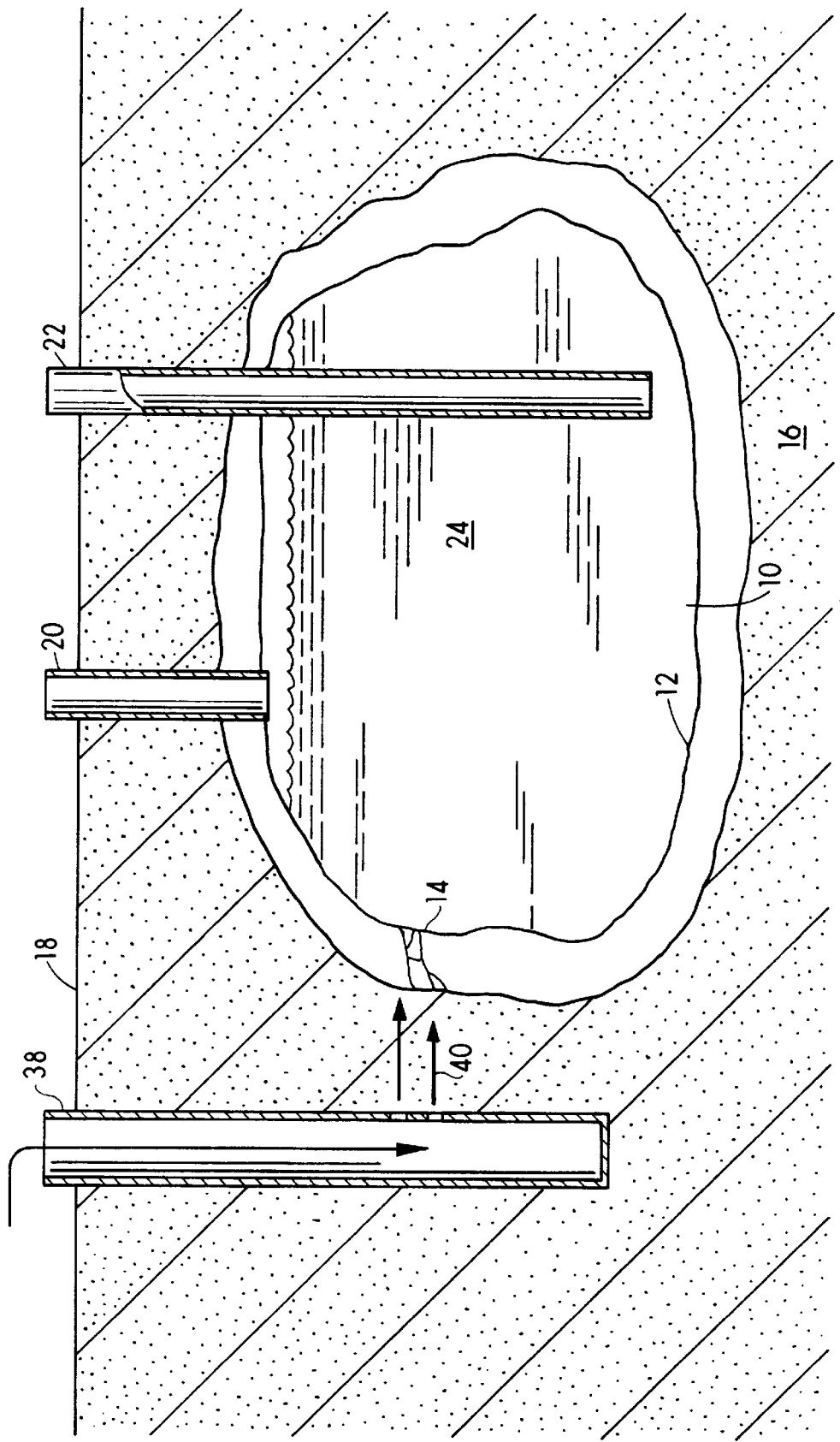
FIG. 3 is a conceptualized view of the salt dome storage cavern of FIG. 1 in which an alternate embodiment of the process of the present invention is practiced.

Another embodiment of the present invention is described with reference to FIG. 3, wherein elements common to FIG. 1 are designated by the same reference characters. A salt dome storage cavern 10 is provided in FIG. 3 that is substantially identical to the salt dome storage cavern 10 of FIG. 1. The treatment process described in association with FIG. 3, however, applies the gelation solution to the treatment region 14 by dispensing the gelation solution via an injection well 38 into the geological medium 16 surrounding the cavern 10 and displacing the gelation solution a distance through the geological medium 16 into the treatment region 14. Accordingly, the present embodiment is suitable for treating the cavern 10 when fluid is leaking out of the cavern 10 or, in the alternative, when fluid is leaking into the cavern 10.

The gelation solution is prepared in substantially the same manner as described above. However, an injection well 38 is provided in accordance with teaching within the purview of the skilled artisan. The injection well 38 extends from the surface 18 into the geological medium 16 behind the treatment region 14. The present embodiment is practiced by injecting the gelation solution into the well 38 and discharging the gelation solution downhole as a narrow band designated by arrows 40 into the geological medium 16 proximal to the relatively narrow treatment region 14. The gelation solution is displaced into the treatment region 14 prior to substantial gelation and forms a gel in the treatment region 14 in substantially the same manner as described above. Placement of the gel in the treatment region 14 is enabled even when fluid is leaking out of the cavern 10 because the injection pressure is sufficient for the gelation solution to overcome the pressure against it from fluid escaping the cavern 10. Placement of the gel in the treatment region 14 is facilitated when fluid is leaking into the cavern 10 because the fluid flowing into the cavern 10 entrains the gelation solution and draws it into the treatment region 14 in the same manner as earlier embodiments described above. It is noted that the density of the gelation solution in the present embodiment is a less significant process parameter due to injection and displacement of the gelation solution through the geological medium 16 rather than through the resident liquid 24. Accordingly, it is not necessarily preferable to adjust the density of the gelation solution to achieve effective placement of the gel in the present embodiment.

Although not shown, it is further within the scope of the present invention to position the injection well 38 substantially adjacent to the treatment region 14. The gelation solution is applied to the treatment region 14 by substantially direct injection therein, thereby avoiding the step of dispacing the gelation solution a substantial distance from the injection well 30 to the treatment region 14 through the geological medium 16.

Figure 2:
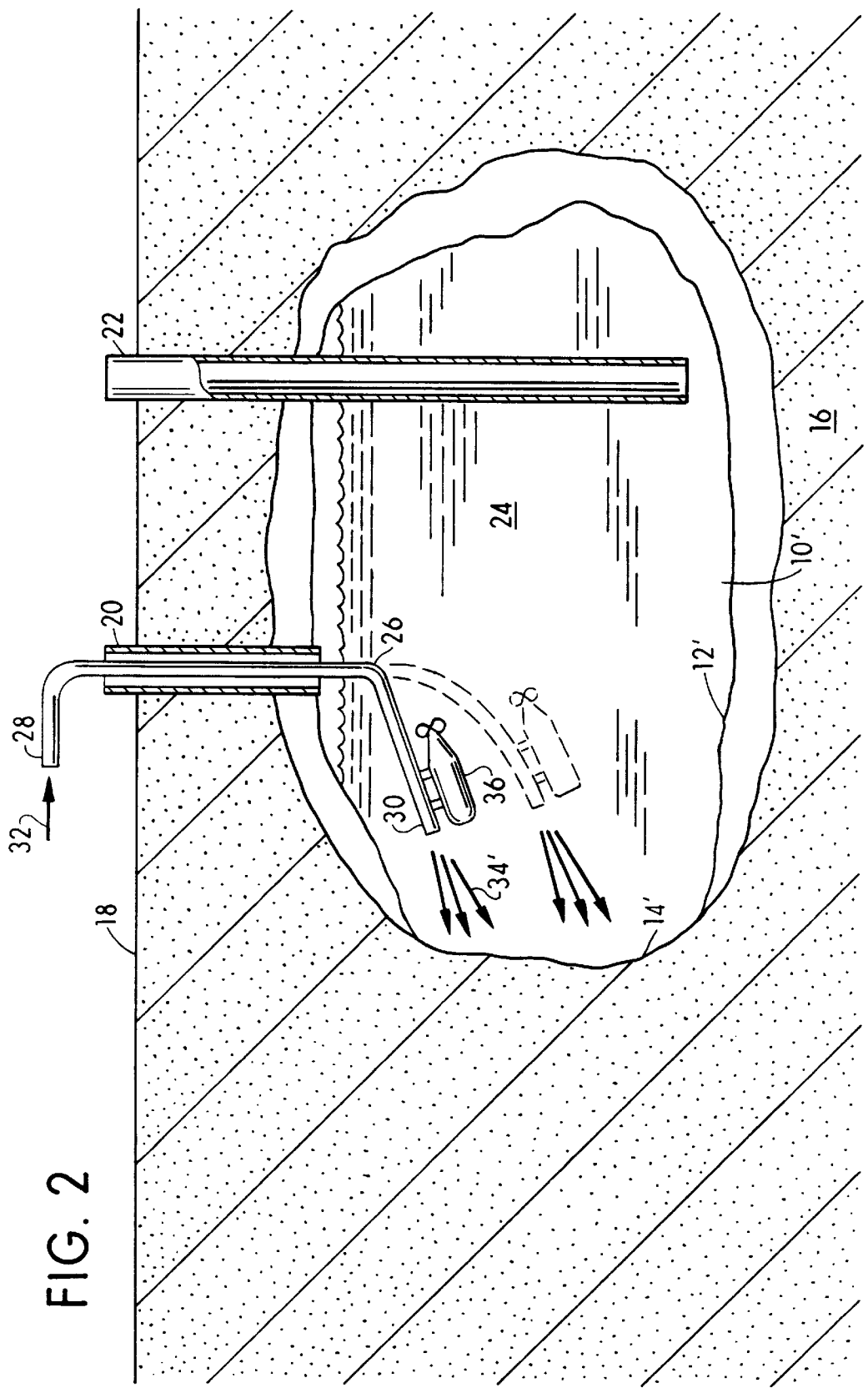
FIG. 2 is a conceptualized view of a salt dome storage cavern in which an alternate embodiment of the process of the present invention is practiced, wherein the cavern wall includes a relatively high permeability treatment region formed from a continuous highly porous medium.
Figure 4:
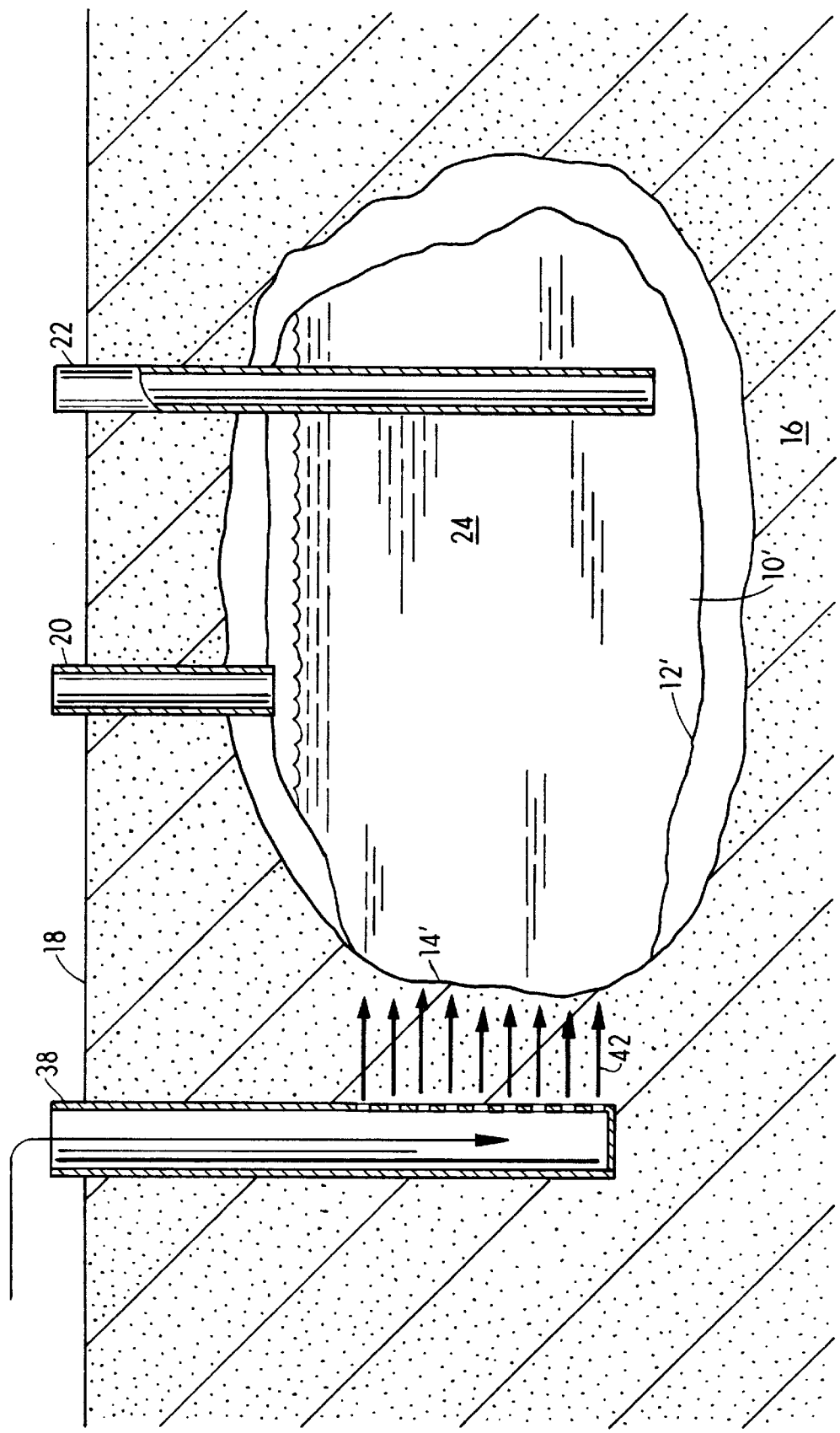
FIG. 4 is a conceptualized view of the salt dome storage cavern of FIG. 2 in which an alternate embodiment of the process of the present invention is practiced.

Still another embodiment of the present invention is described with reference to FIG. 4, wherein elements common to FIGS. 1 and 2 are designated by the same reference characters. A salt dome storage cavern 10' is provided in FIG. 4 that is substantially identical to the salt dome storage cavern 10' of FIG. 2. The treatment process described in association with FIG. 4 is substantially the same as described in FIG. 3, except the gelation solution is applied to the expansive treatment region 14' continuous with the porous geological medium 16 surrounding the wall 12'. Accordingly, the process is practiced by discharging the gelation solution downhole as a broad band designated by arrows 42 corresponding to the wide breadth of the treatment region 14'.

Although not shown, it is further within the scope of the present invention to position the injection well 38 substantially adjacent to the treatment region 14'. The gelation solution is applied to the treatment region 14' by substantially direct injection therein, thereby avoiding the step of displacing the gelation solution a substantial distance from the injection well 30 to the treatment region 14' through the geological medium 16.

The process of the present invention has been described above in each of its embodiments, wherein the treatment composition is applied to the treatment region 14, 14' in the form of a gelation solution which is substantially gelled at the treatment region 14, 14'. It is further within the scope of the present invention to practice each of the above-described embodiments, wherein the treatment composition is applied to the treatment region 14, 14' in the form of gel. In accordance with these embodiments, the gelation solution is substantially gelled before reaching the treatment region 14, 14'. However the resulting gel is a flowing gel, being sufficiently fluid to enable application of the gel to the treatment region 14, 14', but having sufficient structure to effectively reduce the permeability of the treatment region 14, 14' upon application thereto.

The following example demonstrates the practice and utility of the present invention, but is not to be construed as limiting the scope thereof.

EXAMPLE

The wall of a salt dome storage cavern having a crude oil stored therein develops a relatively high permeability region with a surface area of 840 m$^2$. The relatively high permeability region enables leakage of the resident liquid, a saturated NaCl brine, therethrough into the surrounding environment at a leak rate of 24,000 l/hr (400 l/min) at the normal operating pressure of the storage cavern. The linear velocity of the leaking resident liquid at a point within the cavern immediately adjacent to the leaking surface of the relatively high permeability region is 2.8 cm/hr (0.69 m/day).

The relatively high permeability region of the storage cavern is modeled by a 47 darcy, 50/70 mesh Ottawa sand positioned in a 5.1 cm ID flow-through apparatus. It is noted that the permeability of the model far exceeds the average permeability of the relatively high permeability region to ensure the effectiveness of the resulting treatment based on the model. A gelation solution is prepared from a polymer, crosslinking agent and aqueous solvent. The polymer is solid ALCOFLOOD® 935, an acrylamide/acrylate copolymer of intermediate high molecular weight available from Allied Colloids. The active polymer concentration in the gelation solution is 1.0% by weight. The crosslinking agent is a chromic triacetate complex. The aqueous solvent is a saturated sodium chloride brine. The density of the gelation solution is equilibrated to that of the resident liquid by incorporating low density porous ceramic beads into the aqueous solvent of the gelation solution, thereby reducing the density of the gelation solution.

The gelation solution is applied to the sandpack and gelled to completion forming a 7.6 cm thick plate of a clear, rigid, and mildly ringing gel atop the sandpack. The resulting gel is subjected to a differential pressure of 1100 kPa for a period of 25 days. The final near-equilibrium flow rate of the brine through the sandpack is 2.5–3.0 cm$^3$/day which corresponds to about a 270,000 fold reduction in the fluid flow capacity through the sandpack after the treatment process of the present invention.

While the foregoing preferred embodiments of the invention have been described and shown, it is understood that all alternatives and modifications, such as those suggested and others, may be made thereto and fall within the scope of the invention. For example, although the present invention is described above for purposes of illustration with reference to a salt dome storage cavern for storing a crude oil, it is apparent to the skilled artisan that the present invention is generally applicable to other types of subterranean storage caverns and to other types of commercial fluids stored therein.

I claim:

1. A process for reducing fluid leakage in a subterranean fluid storage cavern comprising:

providing a subterranean storage cavern having an earthen wall with a relatively high permeability region enabling fluid leakage therethrough, wherein a resident liquid resides in said cavern;

preparing a gelation solution including a crosslinkable polymer, a crosslinking agent, and an aqueous solvent;

dispensing said gelation solution into said resident liquid;

conveying said gelation solution in said resident liquid to said relatively high permeability region; and gelling said gelation solution at said high permeability region, forming a gel to reduce the permeability of said relatively high permeability region.

2. The process of claim 1 wherein the density of said gelation solution is adjusted to a substantially neutral density relative to said resident liquid.

3. The process of claim 1 wherein said relatively high permeability region contains an anomaly.

4. The process of claim 1 wherein said relatively high permeability region is a porous medium.

5. The process of claim 1 wherein said crosslinkable polymer is an acrylamide polymer and said crosslinking agent is a chromium(III)/carboxylate complex.

6. A process for reducing fluid leakage in a subterranean fluid storage cavern comprising:

providing a subterranean storage cavern having an earthen wall with a relatively high permeability region enabling fluid leakage therethrough, wherein a resident liquid resides in said cavern;

preparing a gelation solution including a crosslinkable polymer, a crosslinking agent, and an aqueous solvent;

adjusting the density of said gelation solution so that the adjusted density of said gelation solution and the density of said resident liquid are substantially equal by adding a density control agent to said gelation;

dispensing said gelation solution into said resident liquid;

conveying said gelation solution in said resident liquid to said relatively high permeability region; and gelling said gelation solution at said relatively high permeability region, forming a gel to reduce the permeability of said relatively high permeability region.

7. The process of claim 6 wherein the density of said gelation solution is increased by adding a higher density solid to said gelation solution.

8. The process of claim 6 wherein the density of said gelation solution is decreased by adding a lower density solid to said gelation solution.

9. The process of claim 6 wherein the density of said gelation solution is increased by adding a higher density fluid to said gelation solution.

10. The process of claim 6 wherein the density of said gelation solution is decreased by adding a lower density fluid to said gelation solution.

11. The process of claim 6 wherein said relatively high permeability region contains an anomaly.

12. The process of claim 6 wherein said relatively high permeability region is a porous medium.

13. The process of claim 6 wherein said crosslinkable polymer is an acrylamide polymer and said crosslinking agent is a chromium(III)/carboxylate complex.

14. A process for reducing fluid leakage in a subterranean fluid storage cavern comprising:

providing a subterranean storage cavern having an earthen wall with a relatively high permeability region enabling fluid leakage therethrough and an injection well penetrating a geological medium in fluid communication with said relatively high permeability region;

preparing a gelation solution including a crosslinkable polymer, a crosslinking agent, and an aqueous solvent;

injecting said gelation solution into said geological medium;

conveying said gelation solution through said geological medium to said relatively high permeability region; and gelling said gelation solution to form a gel to reduce the permeability of said relatively high permeability region.

15. The process of claim 14 wherein said relatively high permeability region contains an anomaly.

16. The process of claim 14 wherein said relatively high permeability region is a porous medium.

17. The process of claim 14 wherein said crosslinkable polymer is an acrylamide polymer and said crosslinking agent is a chromium(III)/carboxylate complex.

18. A process for reducing fluid leakage in a subterranean fluid storage cavern comprising:

providing a subterranean storage cavern having an earthen wall with a relatively high permeability region enabling fluid leakage therethrough, wherein a resident liquid resides in said cavern;

preparing a gelation solution including a crosslinkable polymer, a crosslinking agent, and an aqueous solvent;

gelling said gelation solution to form a gel;

dispensing said gel into said resident liquid; and conveying said gel in said resident liquid to said relatively high permeability region to reduce the permeability of said relatively high permeability region.

19. The process of claim 18 wherein said relatively high permeability region contains an anomaly.

20. The process of claim 18 wherein said relatively high permeability region is a porous medium.

21. The process of claim 18 wherein said crosslinkable polymer is an acrylamide polymer and said crosslinking agent is a chromium(III)/carboxylate complex.

22. A process for reducing fluid leakage in a subterranean fluid storage cavern comprising:

providing a subterranean storage cavern having an earthen wall with a relatively high permeability region enabling fluid leakage therethrough;

preparing a gelation solution including a crosslinkable polymer, a crosslinking agent, and an aqueous solvent;

applying said gelation solution from said subterranean storage cavern directly to said relatively high permeability region; and gelling said gelation solution at said high permeability region, forming a gel to reduce the permeability of said relatively high permeability region.

23. The process of claim 22 wherein said relatively high permeability region contains an anomaly.

24. The process of claim 22 wherein said relatively high permeability region is a porous medium.

25. The process of claim 22 wherein said crosslinkable polymer is an acrylamide polymer and said crosslinking agent is a chromium(III)/carboxylate complex.

26. A process for reducing fluid leakage in a subterranean fluid storage cavern comprising:

providing a subterranean storage cavern having an earthen wall with a relatively high permeability region enabling fluid leakage therethrough;

preparing a gelation solution including a crosslinkable polymer, a crosslinking agent, and an aqueous solvent;

gelling said gelation solution to form a gel; and applying said gel from said subterranean storage cavern directly to said relatively high permeability region to reduce the permeability of said relatively high permeability region.

27. The process of claim 26 wherein said relatively high permeability region contains an anomaly.

28. The process of claim 26 wherein said relatively high permeability region is a porous medium.

29. The process of claim 26 wherein said crosslinkable polymer is an acrylamide polymer and said crosslinking agent is a chromium(III)/carboxylate complex.

30. A process for reducing fluid leakage in a subterranean fluid storage cavern comprising:

providing a subterranean storage cavern having an earthen wall with a relatively high permeability region enabling fluid leakage therethrough and an injection well penetrating a geological medium in fluid communication with said relatively high permeability region;

preparing a gelation solution including a crosslinkable polymer, a crosslinking agent, and an aqueous solvent;

gelling said gelation solution to form a gel;

injecting said gel into said geological medium; and conveying said gel through said geological medium to said relatively high permeability region to reduce the permeability of said relatively high permeability region.

31. The process of claim 30 wherein said relatively high permeability region contains an anomaly.

32. The process of claim 30 wherein said relatively high permeability region is a porous medium.

33. The process of claim 30 wherein said crosslinkable polymer is an acrylamide polymer and said crosslinking agent is a chromium(III)/carboxylate complex.

34. A process for reducing fluid leakage in a subterranean fluid storage cavern comprising:

providing a subterranean storage cavern having an earthen wall with a relatively high permeability region enabling fluid leakage therethrough and an injection well in fluid communication with said relatively high permeability region;

preparing a gelation solution including a crosslinkable polymer, a crosslinking agent, and an aqueous solvent;

injecting said gelation solution directly into said relatively high permeability region via said injection well; and gelling said gelation solution at said relatively high permeability region, forming a gel to reduce the permeability of said relatively high permeability region.

35. The process of claim 34 wherein said relatively high permeability region contains an anomaly.

36. The process of claim 34 wherein said relatively high permeability region is a porous medium.

37. The process of claim 34 wherein said crosslinkable polymer is an acrylamide polymer and said crosslinking agent is a chromium(III)/carboxylate complex.

38. A process for reducing fluid leakage in a subterranean fluid storage cavern comprising:

providing a subterranean storage cavern having an earthen wall with a relatively high permeability region enabling fluid leakage therethrough and an injection well in fluid communication with said relatively high permeability region;

preparing a gelation solution including a crosslinkable polymer, a crosslinking agent, and an aqueous solvent;

gelling said gelation solution to form a gel; and injecting said gel directly into said relatively high permeability region via said injection well to reduce the permeability of said relatively high permeability region.

39. The process of claim 38 wherein said relatively high permeability region contains an anomaly.

40. The process of claim 38 wherein said relatively high permeability region is a porous medium.

41. The process of claim 38 wherein said crosslinkable polymer is an acrylamide polymer and said crosslinking agent is a chromium(III)/carboxylate complex.

42. A process for reducing fluid leakage in a subterranean fluid storage cavern comprising:

providing a subterranean storage cavern having an earthen wall with a relatively high permeability region enabling fluid leakage therethrough, wherein a resident liquid resides in said cavern;

preparing a gelation solution including a crosslinkable polymer, a crosslinking agent, and an aqueous solvent;

adjusting the density of said gelation solution so that the adjusted density of said gelation solution and the density of said resident liquid are substantially equal by adding a density control agent to said gelation solution increasing the density of said gelation solution;

gelling said gelation solution to form a gel;

dispensing said gel into said resident liquid; and conveying said gel to said relatively high permeability region to reduce the permeability of said relatively high permeability region.

43. The process of claim 42 wherein said relatively high permeability region contains an anomaly.

44. The process of claim 42 wherein said relatively high permeability region is a porous medium.

45. The process of claim 42 wherein said crosslinkable polymer is an acrylamide polymer and said crosslinking agent is a chromium(III)/carboxylate complex.

* * * * *